Patented Apr. 17, 1951

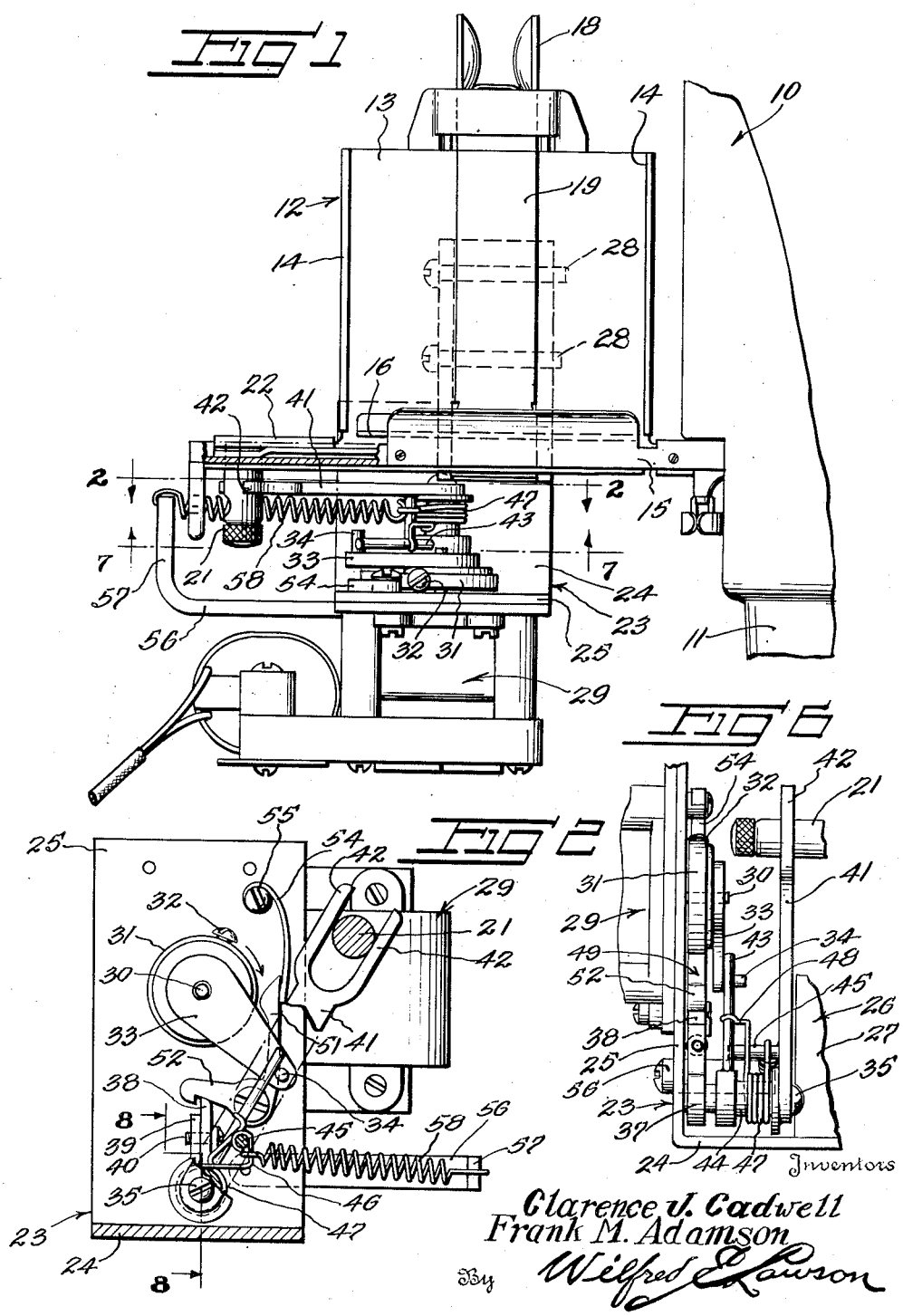

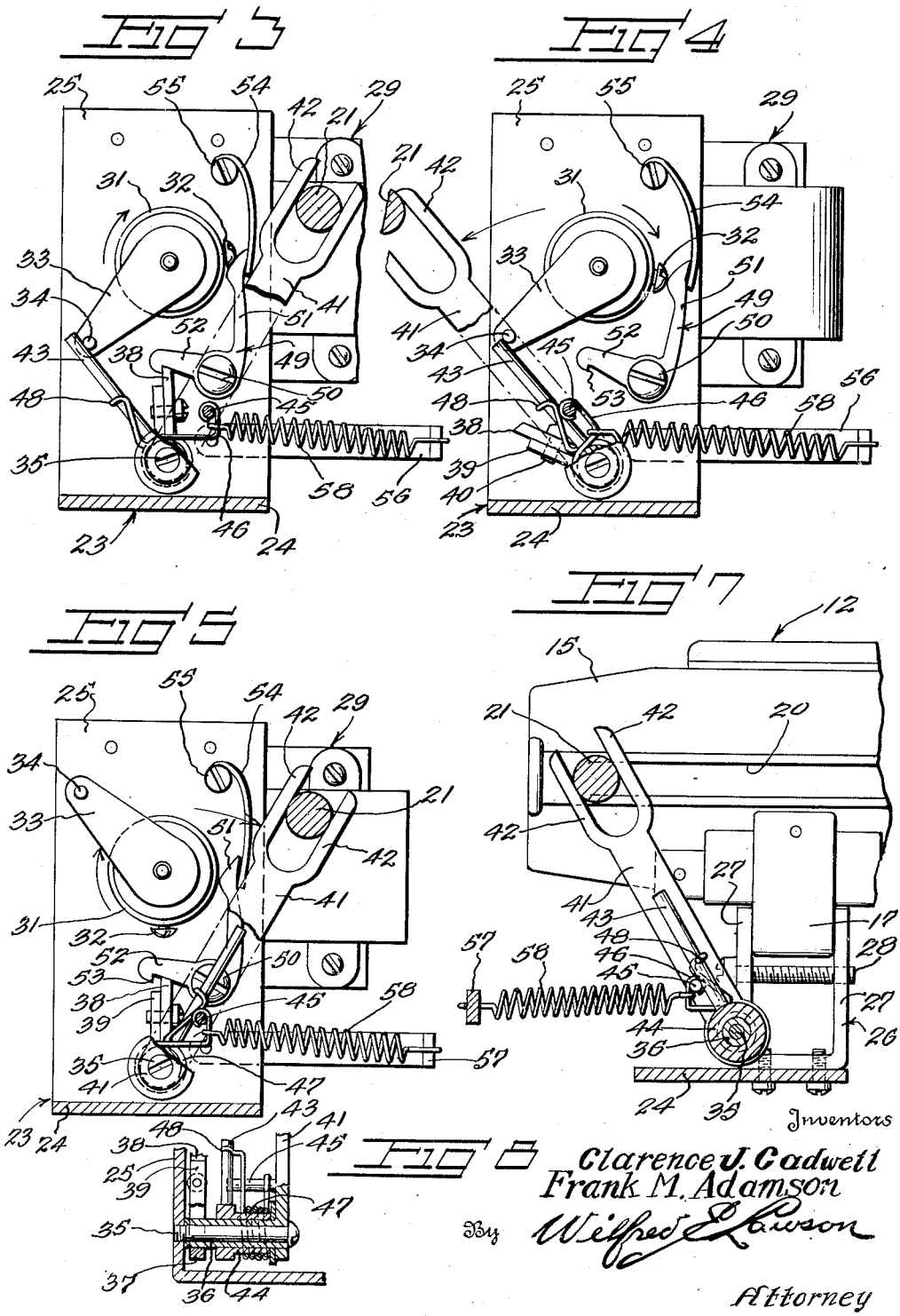

2,549,289

UNITED STATES PATENT OFFICE 2,549,289

MECHANISM FOR AUTOMATICALLY OPERATING A PICTURE SLIDE CHANGER OF THE MANUAL TYPE

Clarence J. Cadwell, Carpinteria, and Frank M. Adamson, Los Angeles, Calif., assignors to The Cadwell Corporation, Beverly Hills, Calif., a corporation of California Application December 31, 1948, Serial No. 68,674

14 Claims. (Cl. 88—28)

This invention relates generally to picture projecting machines of the still picture type in connection with which use is made of manually operated slide changers.

A principal object of the present invention is to provide a simple and inexpensive attachment for a manual slide mechanism by means of which the pictures are changed in a still projector machine, whereby such slide mechanism is automatically operated at predetermined intervals.

Another object of the invention is to provide an attachment for a slide changer of the manual type, which may be easily and quickly connected with the picture changing mechanism without having to make any alterations in the construction of the latter.

Another object of the invention is to provide an attachment of the character stated which functions smoothly but positively and with extreme rapidity.

The invention will be best understood from a consideration of the following detailed description taken in connection with the accompanying drawings forming a part of the present application, with the understanding that the invention is not confined to a strict conformity with the exact details of construction shown and described since obvious modifications will occur to persons skilled in the art, the invention being, of course, confined to the scope of the appended claims.

In the drawings:

Figure 1 is a view in top plan of the device embodied in the present invention showing the same applied to the magazine side of a slide changer of the manual type, the projector being partly in section.

Figure 2 is a vertical section taken substantially on the line 2—2 of Figure 1 showing the positions of the parts at the beginning of the tensioning of the changer actuating spring.

Figure 3 is a view corresponding to Figure 2 but showing the relative positions of the parts immediately preceding the release of the tension spring for the shifting of the slide.

Figure 4 is a view corresponding to Figure 2 but showing the relative positions of the parts immediately following the release of the tensioned slide actuating spring and just before the fork is released for return of the slide to starting position.

Figure 5 is a sectional view corresponding to Figure 2 and showing the positions of the parts when the slide has been returned by the operating fork to starting position ready for the repeating of the cycle.

Figure 6 is a view of the slide changer taken from the side nearest to the picture projecting machine.

Figure 7 is a sectional view in a vertical plane taken substantially on the line 7—7 of Figure 1 looking in the opposite direction from Figure 2.

Figure 8 is a detailed section taken substantially on the line 8—8 of Figure 2.

In the illustration of the application of the present invention use is made of a slide changer of the manual type such as is marketed by a universally known camera and photo supply manufacturer but it is to be understood that although a specific form of slide changer has been illustrated and means is shown whereby the device may be secured in working relation therewith, the invention is not to be considered as limited to use with this particular manufacturer's slide changer but may be used in association with any manual changer to which it is applicable.

Referring particularly to Figure 1 the numeral 10 designates a portion of a still picture projecting machine, a part of the lens tube of which is designated 11.

The numeral 12 generally designates the picture supply or magazine side of the manual slide changer, there being a corresponding portion upon the opposite side of the picture machine to receive the picture slides as they are shifted out of viewing position.

In the structure shown the magazine comprises a bottom 13 having the upstanding side walls 14 between which the picture carrying slides are stacked on edge to be moved forwardly as required for use.

Extending across the forward end of the magazine is the wall 15 toward which the slides are moved by a pusher element 16. This pusher 16 is actuated by a spring, not shown, which is enclosed within an elongated housing 17, see Figure 7, which extends along the under side of the floor plate 13 of the magazine, the pusher being drawn back from the front wall 15 for the insertion of the slides, through the medium of the finger pieces 18 and the elongated tongue 19 extending therefrom to the pusher plate 16.

The front wall 15 is provided with a longitudinal slot 20 through which extends the manual handle 21 which is connected with the slide shifter or actuator 22 which moves across the front end of the magazine at the rear side of the front wall 15.

It is believed that further description of the slide changer is unnecessary. The foregoing description has been given to facilitate the description of the manner in which the present invention is attached to the projector for the operation of the same.

In accordance with the present invention there is provided a bracket which is generally designated 23 and which comprises a bottom or base plate portion 24 and an upstanding mounting plate 25 upon which the several parts of the device are supported or mounted.

The base 24 of the bracket is provided with the substantially U-shaped clamp 26, Figure 7, which comprises the spaced upright jaws 27 which are connected together by transversely extending screws 28. These jaws 27 receive between them the elongated housing or casing 17 in which is contained the operating spring for the pusher plate 16 and when such housing is gripped by the jaws the bracket is maintained with the mounting plate vertical and spaced forwardly from the slide changer front wall 15 as is clearly seen in Figures 1 and 6.

Mounted upon the front or forward side of the vertical mounting plate 25 is a synchronous motor which is generally designated 29 and which is of the type commonly employed in connection with the operation of electric clocks. Such motor is designed to have the shaft 30 thereof make one revolution per minute. As shown the shaft 30 of the synchronous motor extends rearwardly through the mounting plate 25 and supported on and secured to the shaft to turn therewith is a cam wheel 31. In the periphery of this wheel is set the screw 32 which functions as the high point of the cam for the purpose hereinafter described. This screw may also function as means for securing the wheel to the motor shaft.

Also secured to the motor shaft 30 is an end of a crank arm 33 upon the other or outer end of which is carried the pin 34 which is directed rearwardly or toward the front wall 15 of the slide changer.

Below the wheel 31 the vertical mounting plate 25 has secured therein one end of a relatively long pin 35. As shown in Figure 8 this pin has mounted thereon for rocking movement the sleeve 36, one end of which closely approaches the mounting plate 25, while the other end is adjacent to the vertical plane of, but below, the front wall 15 of the slide changer.

Carried upon and secured to the forward end of the rock sleeve 36, that is, the end nearest to the mounting plate 25, is a split collar 37 having two ends 38 and 39 which are brought together above the sleeve and secured tightly by a screw 40 whereby the collar is held against slipping movement on the sleeve. As shown in Figure 2 the end portion 38 of the split collar is longer than the portion 39 and functions as a dog as hereinafter described.

While the dog 38 has been shown as an end of a split collar which is secured around the sleeve 36 it is also within the purview of the present invention to make such dog an integral part of the sleeve if desired. However, by the employment of the split collar 37 necessary adjustments of the dog around the sleeve can be made with respect to other parts with which it is associated.

The outer end of the sleeve 36 has attached thereto one end of a relatively long fork arm 41. The outer end of this arm is formed to provide the spaced parallel fingers or furcations 42. This forked arm is disposed in relatively close proximity to the forward side of the wall 15 of the slide changer and receives in the fork or between the furcations 42 the manual lever 21 of the slide changer.

The numeral 43 designates a thrust arm or lever which is integral at one end with a relatively long tubular hub 44. This hub has extended therethrough the rock sleeve 36 as shown in Figure 8. The free outer end of the hub 44 is in close proximity to the forked arm 41 so that the arm 41 and the thrust lever 43 are in spaced relation as shown.

Carried by the fork 41 above the hub 44 is a pin 45 which extends across the space between the fork 41 and the thrust lever 43. This pin 45 functions as a stop or movement limiting means for the thrust lever 43.

The pin 45 also functions as an anchoring means for the end portion 46 of a coil of twist spring 47 which is wrapped around the hub 44 and which has its outer end 48 hooked across the thrust lever 43 upon the side thereof remote from the pin 45. Accordingly it will be seen that when the lever 43 is swung or oscillated in a direction to apply force to the end 48 of the twist spring, the spring will be placed under tension so long as resistance is offered to the movement of the fork 41 in the same direction.

The swinging of the thrust lever 43 in the desired direction to tension the twist spring 47, in the operation of the device, is effected through the medium of the crank pin 34, in the path of movement of which, under the action of the synchronous motor, the thrust lever lies as is clearly depicted by Figures 2 to 5 inclusive.

The desired opposition to the movement of the fork 41 for a desired period of time is accomplished through the medium of the bell crank latch 49 which is oscillatably mounted upon the screw 50 which is secured to the mounting plate 25 at an elevation between the pin 35 and the cam wheel 31. This bell crank latch comprises the relatively long trip arm 51 which is disposed in the plane of the wheel 31, and the shorter hook arm 52 which has the downwardly directed hook bill 53 positioned to be engaged by the dog 38.

The fingers 51 and 52 are substantially at right angles and the trip finger 51 normally extends approximately vertically and it is engaged at its free end upon the side opposite from the wheel 31, by an end of a leaf spring 54, the other end of which spring is anchored as at 55 to the mounting plate 25. This spring is biased to constantly urge the free end of the trip finger inwardly toward the periphery of the wheel 31 so that upon rotation of this wheel the cam point 32 must ride under the adjacent end of the trip finger and force it to swing outwardly against the tension of the spring, at the same time effecting the upward swinging movement of the hook finger 52 away from the dog 38.

The numeral 56 designates an arm which is secured to the mounting plate 25 at approximately the elevation of the top part of the twist spring 47. This arm extends laterally outwardly or away from the projector machine 10 as is clearly shown in Figure 1 and its outer end has a right angularly turned rearwardly directed portion 57. This portion 57 of the arm terminates substantially in line with the terminal 46 of the twist spring and secured to the end 57 of the arm is one end of a contractile spring 58, the other end of which spring is attached to the end 46 of the twist spring 47 as is clearly shown in any one of Figures 2 to 5, 7 and 8. The spring 58 functions to return the fork arm 41 and the slide shifting arm and plate 21—22, to starting position, by which is meant to the position where the slide shifter plate 22 is set ready to move a new picture slide into position as it is illustrated in Figure 1.

In describing the operation of the present invention, when the slide changer is in ready or starting position the manual handle 21 will be at the extreme outer position remote from the projector machine 10 as shown in Figure 1 and when the automatic operating mechanism is mounted in position the handle 21 will be located in the fork of the arm 41. The fork arm 41 and the thrust lever 43 will be approximately in position illustrated in Figure 7 and the twist spring 47 will be relaxed and the fork and slide return spring 58 will be also relaxed or substantially so. The crank 33 and crank pin 34 may be anywhere between the position in which they are shown in Figure 4 and the position shown in Figure 2 and when the synchronous motor 29 is energized the motor will turn the crank 33 clockwise as indicated by the arrows in Figures 2 to 5, this being the direction of movement of the crank as observed by a person standing behind the projection machine and slide shifter or changer.

Referring now particularly to Figure 2 which illustrates the positions of the parts as shown in top plan in Figure 1, when the motor is energized the crank 33 will turn in the direction indicated until the pin 34 passes across the top end of the thrust lever and moves into engagement with the under side of such lever as shown in Figure 2. The spring 54 will be urging the latch unit 49 to oscillate in a direction to move the end of the finger 51 toward the periphery of the cam wheel 31 and the hook finger will be pressed against the end of the dog 38, such end of the dog being behind the hook point 53 as shown. By this arrangement the latch 49 secures the sleeve 36 against turning movement on the pin 35 and accordingly maintains the forked arm 41 in the position shown particularly in Figures 1 and 7.

As the motor continues to move the crank arm 33 the pin 34 will force the thrust lever 43 to turn around the sleeve 36 as shown by Figure 3. This turning movement of the thrust lever 43 carries with it the attached end 48 of the twist spring 47. This places the twist spring under tension as it will be seen that the other end of the twist spring is held against movement by its connection with the pin 45 carried by the fork lever.

When the parts have assumed the relative positions shown in Figure 3 where the crank pin 36 is approaching the end of the thrust lever 43, the cam point 32 is about ready to pass under the adjacent end of the latch finger 51 to force oscillation of the latch against the tension of the spring 54. As soon as the cam point 32 oscillates the latch 49 against the tension of the spring 54 sufficiently, the hook finger 52 will be disengaged from the dog 38 as shown in Figure 4. Since the rotation of the sleeve 36 is no longer restrained by the hook finger 52 of the latch the fork arm 41 is free to oscillate and the tensioned twist spring 47, through the engagement of the end 46 with the pin 45, effects the rapid swinging over of the fork lever 41 to the position shown in Figure 4. Thus this effects the shifting of the picture slide moving plate 42 in the desired direction to place the slide in position in the projector machine.

Simultaneously with the rapid swing-over of the fork arm 41, the return spring 58 is placed under tension as shown in Figure 4 and is held in this condition until the crank pin 34 disengages from the end of the thrust lever 43. As soon as this disengagement occurs the spring 58 functions to reversely oscillate both the sleeve 36 and the hub 44 thereby returning the fork arm 41, the thrust lever 43 and the dog 38 to starting position and engaging the end of the dog under or behind the bill of the hook finger 52, as illustrated in Figure 5. This returns the slide shifter plate 22 to the starting position shown in Figure 1.

We claim:

1. The combination with a manual slide changer having a slide shifting element and a manual handle attached to the element, of an arm pivotally supported for oscillation in a plane paralleling the line of movement of the handle, an operative coupling between the arm and the handle whereby swinging movement of the arm on its pivot from one position will effect actuation of the slide shifting element, latching means holding said arm in one position, means for building up pressure tending to move the arm against the hold of said latching means, means for releasing the latching means to permit the movement of the arm under the built-up pressure, and means put under tension by said movement of the arm by said pressure for automatically returning the arm to the said one position and reversely moving the said element.

2. Mechanism for automatically, periodically actuating a manual picture slide changer of the type having a shifter element and a manual handle therefor, comprising, a constantly rotating element, a spring, an oscillatable thrust member having an end of the spring attached thereto, means holding the other end of the spring, means for applying movement to the thrust member by and upon the revolution of the rotating element to tension the spring, an actuating coupling between the said means holding the other end of the spring and said handle, and means for releasing the said means holding the other end of the spring when a desired spring tension is obtained whereby the reaction of the tensioned spring effects a shifting of the shifter element through the medium of the handle.

3. Mechanism of the character stated in claim 2 with means for automatically effecting the reverse shifting of the shifter element.

4. Mechanism for periodically automatically actuating a picture slide changer of the type having a shifter element and a manual handle therefor, comprising a constantly rotating element, an arm pivotally supported at one end for oscillation, an operating coupling between the other end of the arm and the manual handle, an oscillatable thrust member, a spring connection between the thrust member and the arm, means whereby the rotating element upon rotation supplies thrust to the thrust member to oscillate the member in a direction to tension the spring, means for holding the arm against oscillation during the period of tensioning the spring, and means for releasing the arm when a desired spring tension is obtained whereby the reaction of the spring effects the oscillation of the arm and the shifting of the slide.

5. Mechanism of the character stated in claim 4, whereby the said means for effecting the release of the arm includes a rotary cam element rotated by said constantly rotating element.

6. Mechanism of the character stated in claim 4, with means for automatically returning the arm to the position in which it was held during the tensioning period of the spring in preparation for a repetition of the operation.

7. An attachment for a picture slide changer of the manual type having a manual handle, comprising a support, means for securing the support to the changer adjacent to said handle, an arm pivotally mounted at one end upon the support for rocking movement through a prescribed arc, means forming an operative coupling between the other end of the arm and the manual handle, a thrust lever pivotally supported at one end on the support for oscillation, a spring connected between the thrust lever and the arm, releasable latch means for securing the arm when the arm is in one position, means for oscillating the thrust lever in a direction to place said spring under tension while the arm is held by the latching means, and means for shifting the latching means for the release of the arm when the spring has attained a desired tension whereby the reaction of the spring effects the oscillation of the arm through the said prescribed arc and the actuation of the slide changer.

8. An attachment of the character stated in claim 7, wherein the said means for oscillating the thrust lever comprises a motor, a crank arm carried by the motor and a pin carried by the crank arm, said pin being positioned to contact a side of the thrust lever during the turning movement of the crank arm through a part of its turning arc.

9. An attachment of the character stated in claim 7 wherein the said means for oscillating the thrust lever comprises a motor, a crank arm carried by the motor and a pin carried by the crank arm, said pin being positioned to contact a side of the thrust lever during the turning movement of the crank arm through a part of its turning arc and the said means for shifting the latching means comprising a cam point connected to and rotating with the crank lever.

10. Mechanism of the character stated in claim 7, with means for automatically effecting the return oscillation of the arm through said arc upon the completion of the movement of the arm by said spring.

11. Mechanism for attachment to a manually operated picture slide changer having a manual handle, comprising a support, means for attaching the support to the changer adjacent to said handle, a shaft carried by the support, an arm mounted upon the shaft for oscillation through a prescribed arc, means for coupling the arm with the manual handle whereby oscillation of the arm in said arc will effect the actuation of the slide projector, a thrust lever supported at one end for oscillation coaxially with but independently of said arm, a twist spring supported coaxially with the arm and lever and having one end attached to the arm and the upper end attached to the lever, a pivoted latch element having a trip finger and a hook finger, means detachably coupling the hook finger with the arm whereby the arm is held against oscillation when in one position, a rotary means for engaging and imparting thrust movement to the lever through a part of its rotary movement and while the arm is secured by the latch finger, and cam means for engaging the trip finger to oscillate the latch and release the hook finger from the arm when said thrust lever has been moved to a prescribed position by said rotary means whereby the reaction of the spring effects the slide shifting movement of the arm through said arc.

12. An attachment of the character stated in claim 11 with a second spring having one end connected with the arm and having its other end secured against movement, the second spring being placed under tension upon the actuation of the arm through said arc by the first mentioned spring, the thrust lever and oscillating means being disengaged from the thrust lever immediately following the release of the arm by the latching means whereby the second mentioned spring may effect the return movement of the arm.

13. The combination with a manual slide changer having a slide shifting element and a manual handle attached to the element, of an arm pivotally supported for oscillation in a plane paralleling the line of movement of the handle, an operative coupling between the arm and the handle whereby swinging movement of the arm on its pivot from one position will effect actuation of the slide shifting element, an oscillatable latch securing the arm in said one position, a constantly rotating member, means actuated by and with each rotation of the rotating member for imposing a resilient force upon the arm tending to move the arm against the hold of said latch, means actuated by the rotating member for disengaging the latch from the arm at the period of maximum force application to the arm for the swinging of the arm, and means for effecting return of the arm to the said one position and its reengagement by said latch.

14. The combination as set forth in claim 13, wherein the said means for effecting return of the arm to the said one position comprises a spring connected with the arm and placed under tension by and upon the movement of the arm by the applied force.

CLARENCE J. CADWELL.
FRANK M. ADAMSON.

REFERENCES CITED

The following references are of record in the file of this patent:

UNITED STATES PATENTS

| Number | Name | Date |
|---|---|---|
| 590,903 | Newman | Sept. 28, 1897 |
| 1,226,176 | Bierbaum | May 15, 1917 |
| 1,650,671 | Vernan | Nov. 29, 1927 |

FOREIGN PATENTS

| Number | Country | Date |
|---|---|---|
| 319,726 | Germany | Mar. 27, 1920 |
| 254,520 | Great Britain | July 8, 1926 |